(12) United States Patent
Osawa (10) Patent No.: US 12,459,305 B2
(45) Date of Patent: Nov. 4, 2025

(54) TIRE

(71) Applicant: BRIDGESTONE CORPORATION, Tokyo (JP)

(72) Inventor: Toru Osawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/714,219

(22) PCT Filed: Sep. 20, 2022

(86) PCT No.: PCT/JP2022/035033
§ 371 (c)(1),
(2) Date: May 29, 2024

(87) PCT Pub. No.: WO2023/112416
PCT Pub. Date: Jun. 22, 2023

(65) Prior Publication Data
US 2025/0178380 A1    Jun. 5, 2025

(30) Foreign Application Priority Data
Dec. 17, 2021  (JP) .............................. 2021-205597

(51) Int. Cl.
*B60C 11/24* (2006.01)
*B60C 13/02* (2006.01)

(52) U.S. Cl.
CPC ............. *B60C 11/24* (2013.01); *B60C 13/02* (2013.01)

(58) Field of Classification Search
CPC ...................................................... B60C 11/24
See application file for complete search history.

(56) References Cited

U.S. PATENT DOCUMENTS

| 9,981,509 | B2 | 5/2018 | Katahira et al. | |
| 2015/0328937 | A1* | 11/2015 | Girard | B60C 11/03 |
| | | | | 152/154.2 |
| 2016/0355059 | A1 | 12/2016 | Katahira et al. | |
| 2017/0100968 | A1 | 4/2017 | Lebedev | |
| 2019/0135048 | A1* | 5/2019 | Thompson | B60C 11/24 |
| 2021/0229501 | A1* | 7/2021 | Tanada | B60C 11/005 |

FOREIGN PATENT DOCUMENTS

| JP | H02139104 U | 11/1990 |
| JP | H11254914 A | 9/1999 |
| JP | 2000-177322 A * | 6/2000 |

(Continued)

OTHER PUBLICATIONS

Machine translation fior Japan 2006-062584 (Year: 2025).*

(Continued)

*Primary Examiner* — Steven D Maki
(74) *Attorney, Agent, or Firm* — KENJA IP LAW PC (57) ABSTRACT

The tire 10 is a tire 10 having a smooth pattern with substantially no grooves on a tread surface 11 of a tread portion 1 including tread rubber 1a, wherein on a side portion outer surface 21 of the tire 10, a plurality of ridges 30 protruding from the side portion outer surface 21 and extending in the tire circumferential direction, to check a remaining tread gauge to the tread rubber 1a reaches its wear limit, are provided spaced apart from each other in the tire radial direction.

5 Claims, 4 Drawing Sheets

(56) References Cited

FOREIGN PATENT DOCUMENTS

| | | | | |
|---|---|---|---|---|
| JP | 2004-291937 A | * | 10/2004 | ............. B60C 13/02 |
| JP | 2006-062584 A | * | 3/2006 | |
| JP | 2016501151 A | | 1/2016 | |
| JP | 2017206157 A | | 11/2017 | |
| JP | 2017206158 A | | 11/2017 | |
| JP | 2017206159 A | | 11/2017 | |
| WO | 2015087574 A1 | | 6/2015 | |

OTHER PUBLICATIONS

Machine translation for Japan 2000-177322 (Year: 2025).*
Machine translation for Japan 2004-291937 (Year: 2025).*
Jun. 13, 2024, International Preliminary Report on Patentability issued in the International Patent Application No. PCT/JP2022/035033.
Dec. 13, 2022, International Search Report issued in the International Patent Application No. PCT/JP2022/035033.
Feb. 3, 2025, search result of the Extended European Search Report issued by the European Patent Office in the corresponding European Patent Application No. 22906951.3.

* cited by examiner

TIRE

TECHNICAL FIELD

This disclosure relates to a tire.

This application claims priority based on Japanese Patent Application No. 2021-205597 filed in Japan on Dec. 17, 2021, and the entire content thereof is incorporated herein.

BACKGROUND

Conventionally, for example, in tires for construction and mining vehicles such as road hall dump truck tires used in underground mines and tunnel construction sites, tires with a so-called smooth tread pattern without grooves on the tread surface are sometimes used, mainly to improve wear life, etc.

Since the remaining groove depth of a tire with such a smooth pattern cannot be determined by a wear indicator on the groove bottom or by measuring the groove depth with a depth gauge, as is the case with general tires having grooves, various means have been studied and used to determine the amount of tread rubber wear (and thus the remaining tread gauge until the tread rubber reaches its wear limit) (e.g., PTL1).

CITATION LIST

Patent Literature

PTL 1: JP H11-254914 A

SUMMARY

Technical Problem

As a means of determining the remaining tread gauge to the wear limit of tires with a smooth pattern, a narrow slit extending to the outer surface of the side portion is provided at the edge of the tread portion at several locations around the circumference of the tire, and a depth gauge is inserted into the slit from the tread surface to measure the remaining depth of the slit to determine the remaining tread gauge to the wear limit.

However, in the case of the road hall dump truck tires, for example, it is dark in the underground tunnels, which are the main work sites, and if breaking or chipping occurs near the shoulder portion of the tire where the slits are provided, it is easily confused with a slit. This makes it difficult to see the position of the slit into which the depth gauge should be inserted, and in turn, the remaining tread gauge to the wear limit may not be easily grasped.

Therefore, it is an object of the present disclosure to provide a tire with a smooth pattern that allows the remaining tread gauge to be easily grasped.

Solution to Problem

The tire of this disclosure is:
a tire having a smooth pattern with substantially no grooves on a tread surface of a tread portion including tread rubber, wherein
on a side portion outer surface of the tire, a plurality of ridges protruding from the side portion outer surface and extending in the tire circumferential direction, for checking a remaining tread gauge until the tread rubber reaches its wear limit, are provided spaced apart from each other in the tire radial direction.

Advantageous Effect

According to the present disclosure, it is possible to provide a tire with a smooth pattern that allows the remaining tread gauge to be easily grasped.

DETAILED DESCRIPTION

The tire according to the present disclosure can be suitably used for any type of tire with a smooth pattern, for example: tires for construction and mining vehicles with a smooth pattern, such as road hall dump truck tires used for excavating, transporting, and loading rocks and minerals in underground mines and tunnel construction sites, and wheel loader tires used in open pits above ground in mines; tires for industrial vehicles with a smooth pattern, such as reach stacker and container handler tires used for moving and stacking shipping containers at ports and cargo transshipment centers; and tires for track vehicles with a smooth pattern used in subways, monorails, new transit systems, etc.

Hereinafter, embodiments of a tire according to the present disclosure will be described by way of example with reference to the drawings. However, the drawings are schematic, and the dimensions and ratios between dimensions may differ from the reality. Common members and parts in each figure are designated by the same reference numerals/signs. In some drawings, the tire width direction is indicated by the sign "WD", the tire radial direction by the sign "RD", and the tire circumferential direction by the sign "CD".

Figure 1:
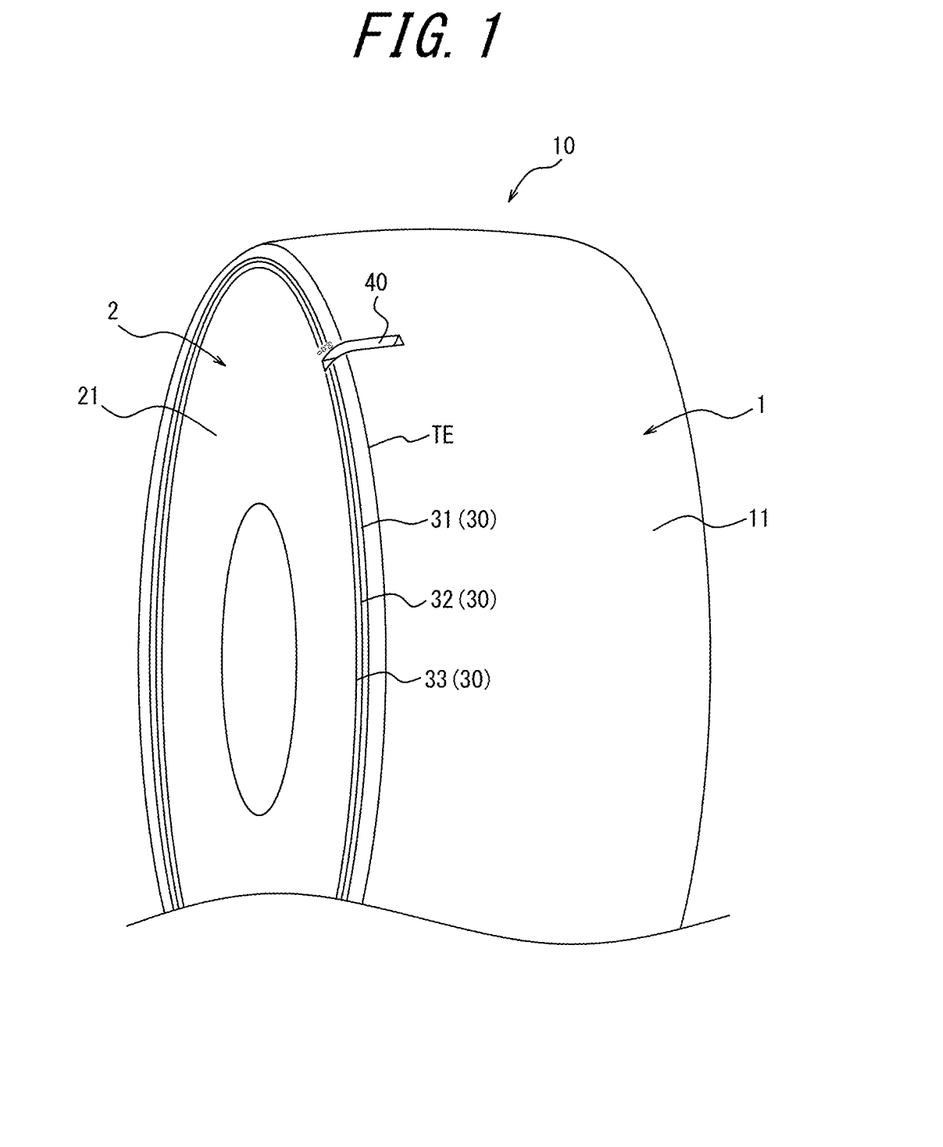
FIG. 1 is a partial perspective view of a tire according to one embodiment of this disclosure, schematically illustrating the tire viewed from diagonally above on the left.
Figure 2:
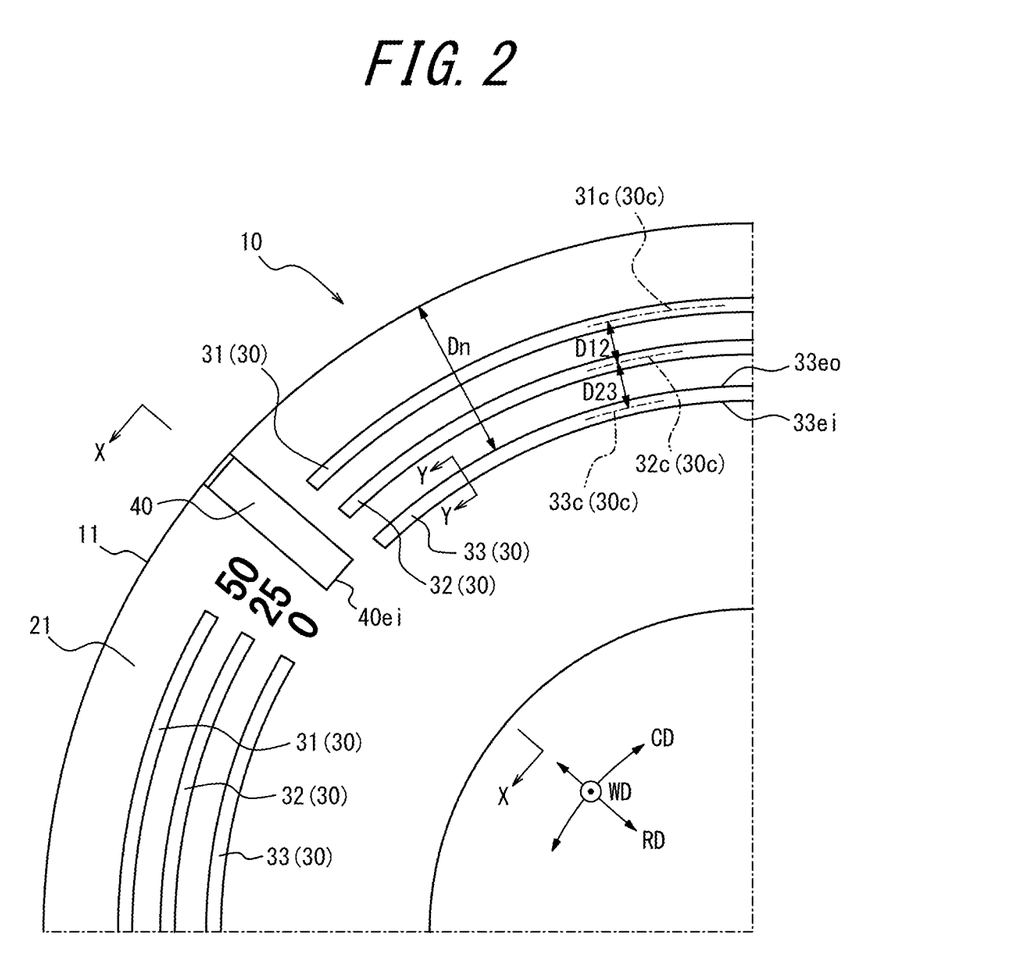
FIG. 2 is a partial side view of the tire illustrated in FIG. 1, viewed from the side of the tire.
Figure 3:
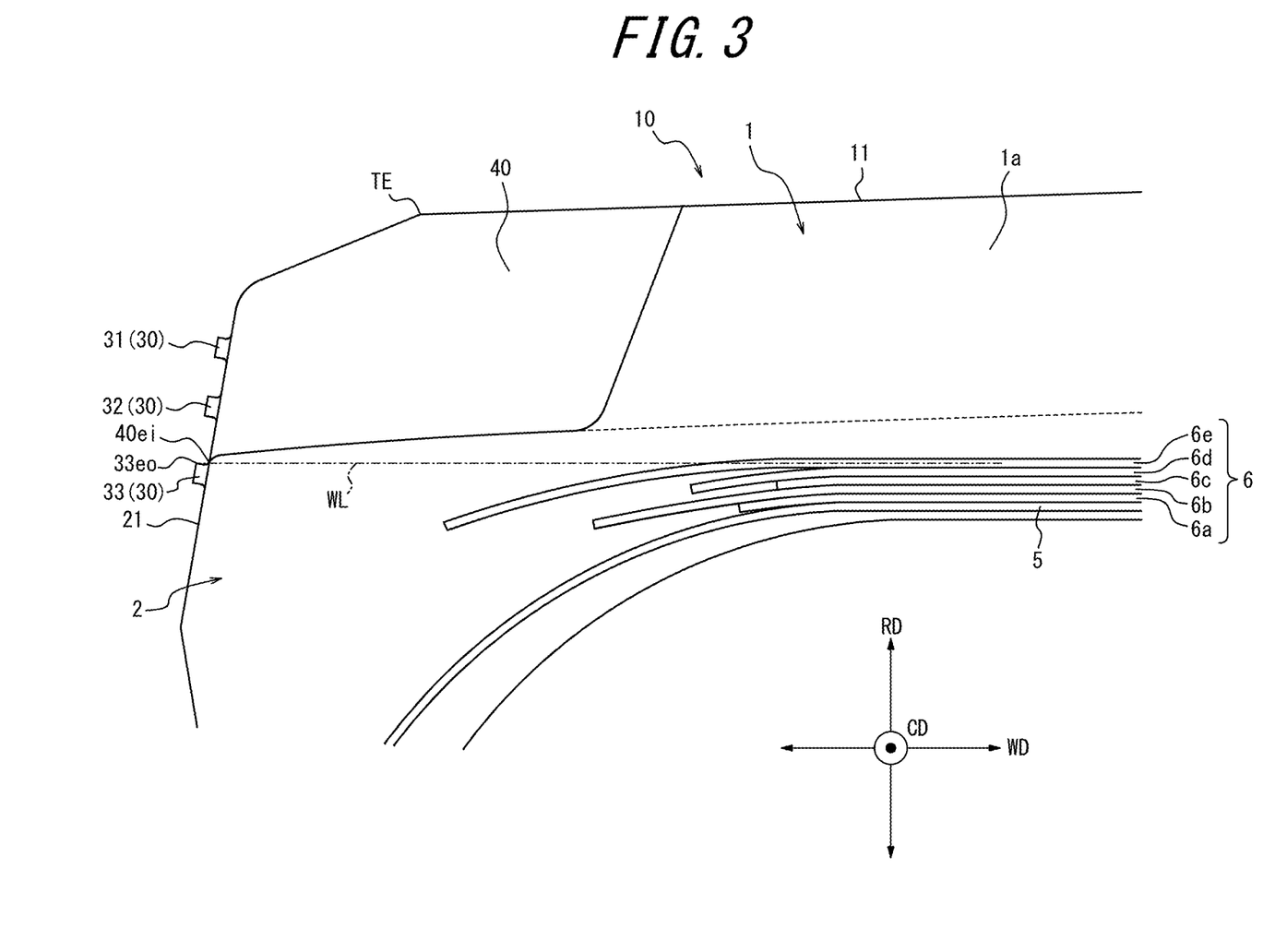
FIG. 3 is a partial cross-sectional view in the tire width direction, illustrating a part of the tire in FIG. 1 in a reference condition, taken along the line X-X in FIG. 2.

FIGS. 1 to 3 illustrate a tire 10 in accordance with one embodiment of this disclosure. FIG. 1 is a partial perspective view of a tire according to one embodiment of this disclosure, schematically illustrating the tire viewed from diagonally above on the left; FIG. 2 is a partial side view of the tire illustrated in FIG. 1, viewed from the side of the tire; and FIG. 3 is a partial cross-sectional view in the tire width direction, illustrating a part of the tire in FIG. 1 in a reference condition, taken along the line X-X in FIG. 2.

Note, that the tire 10 of this disclosure may be configured as any type of tire.

Hereafter, unless otherwise noted, the positional relationship and dimensions of each element shall be measured under the reference condition, with the tire assembled on an applicable rim, filled with prescribed internal pressure, and unloaded.

As used herein, the term "tread surface" means the outer surface around the entire circumference of the tire that is in contact with the road surface when the tire is assembled on the applicable rim, filled with the prescribed internal pressure, and rolled under a maximum load, and the term "tread edge" refers to the outer edge of the tread surface in the tire width direction. In addition, as used herein, the side closer to the tire lumen is referred to as the "inside" of the tire, and the side farther from the tire lumen is referred to as the "outside" of the tire.

As used herein, the term "applicable rim" refers to the standard rim in the applicable size (Measuring Rim in ETRTO's STANDARDS MANUAL and Design Rim in TRA's YEAR BOOK) as described or as may be described in the future in the industrial standard, which is valid for the region in which the tire is produced and used, such as JATMA YEAR BOOK of JATMA (Japan Automobile Tyre Manufacturers Association) in Japan, STANDARDS MANUAL of ETRTO (The European Tyre and Rim Technical Organization) in Europe, and YEAR BOOK of TRA (The Tire and Rim Association, Inc.) in the United States. For sizes not listed in these industrial standards, the term "applicable rim" refers to a rim with a width corresponding to the bead width of the pneumatic tire. The "applicable rim" includes current sizes as well as future sizes to be listed in the aforementioned industrial standards. An example of the "size as described in the future" could be the sizes listed as "FUTURE DEVELOPMENTS" in the ETRTO 2013 edition.

As used herein, the term "prescribed internal pressure" refers to the air pressure (maximum air pressure) corresponding to the maximum load capacity of a single wheel in the applicable size and ply rating, as described in the aforementioned JATMA YEAR BOOK and other industrial standards. In the case that the size is not listed in the aforementioned industrial standards, the term "prescribed internal pressure" refers to the air pressure (maximum air pressure) corresponding to the maximum load capacity specified for each vehicle in which the tire is mounted. In addition, as used herein, the term "maximum load" means the load corresponding to the maximum load capacity in the tire of the applicable size described in the aforementioned industrial standards, or, for sizes not listed in the aforementioned industrial standards, the load corresponding to the maximum load capacity specified for each vehicle in which the tire is mounted.

In addition, as used herein, the term "wear limit" refers to the condition of the tread rubber at the limit of wear as determined by the tire producer as the tire cannot be used any longer, and the term "wear limit position" refers to the tire radial position of the tread surface when the tire is at its wear limit. The wear limit does not have to be a condition that could be a realistic wear limit, e.g., the belt in the tread portion would be exposed, but may be more safely defined, for example, as a condition where the tread surface locates on slightly tire radial outer side than the position of the tread surface in the realistic wear limit.

Furthermore, as used herein, the term "remaining tread gauge" refers to the maximum thickness of the tread rubber remaining in the tire radial direction before reaching the wear limit. The remaining tread gauge is, in other words, can be obtained by subtracting the amount of wear in the tire radial direction from the maximum thickness in the tire radial direction of the tread rubber of a new tire.

As illustrated in FIGS. 1 and 3, the tire 10 of this embodiment has a tread portion constituting the outer part of the tire 10 in the tire radial direction, and side portions 2 constituting both outer parts of the tire 10 in the tire width direction. The tread portion 1 and the side portions 2 partially overlap each other in both outer parts in the tire width direction of the tread portion 1 and an outer part in the tire radial direction of each of the side portion 2, respectively. Therefore, a side portion outer surface 21 described below also includes the outer surface on the outer side in the tire width direction of both outer parts in the tire width direction of the tread portion 1. As illustrated in FIG. 3, the tire 10 has a carcass 5 comprising one or more carcass layers extending between both bead portions (not illustrated), and a belt 6 comprising one or more belt layers (in the illustrated example, five layers indicated by signs 6a to 6e) disposed on the outer side of the crown of the carcass 5 in the tire radial direction. Tread rubber 1a is provided on the outer side of the belt 6 in the tire radial direction, in the tread portion 1 of the tire 10.

In this embodiment, the internal configuration of the tire 10 is similar to that of a typical tire, as described above. However, the internal configuration of tire 10 is not limited to this. The internal configuration of the tire 10 may be arbitrary.

As illustrated in FIGS. 1 and 3, the tire 10 of this embodiment is a tire having a so-called smooth pattern, with substantially no grooves on the tread surface 11 of the tread portion 1 including tread rubber 1a. That is, the tire 10 has substantially no grooves for drainage or other purposes on the tread surface 11, other than a slit 40 for checking the remaining tread gauge, which is described below. The smooth tread pattern of the tire 10 ensures sufficient volume of the tread rubber 1a and sufficient tread stiffness, thus providing sufficient wear life, etc.

As illustrated in FIGS. 1 to 3, in this embodiment, the tire 10 is provided with, on the outer surface of the side portion 2 (hereinafter referred to as the "side portion outer surface") 21, a plurality (three in this embodiment) of ridges 30 (31 to 33) protruding from the side portion outer surface 21 and extending in the tire circumferential direction, spaced apart from each other in the tire radial direction.

Here, the term "extending in the tire circumferential direction" means that the ridges 30 do not necessarily have to extend continuously over the entire circumference of the tire, but only over at least a part of the circumference of the tire. For example, the ridges 30 may extend, as in the present embodiment (FIGS. 1 to 3), so that they are continuous in the tire circumferential direction except that they are discontinuous in the tire circumferential direction at one place on the tire circumference where the slit 40 is provided, or the ridges 30 may be divided and extended in multiple pieces (e.g., two pieces) on the tire circumference so that they are discontinuous at multiple locations (e.g., two locations) on the tire circumference. However, from the viewpoint of making it easy for the user of the tire 10 to fully see the ridges 30 and check the remaining tread gauge, each of the plurality of ridges 30 preferably extend, in total length in the tire circumferential direction, over 50% or more of the circumference at the tire radial position on the side portion outer surface 21 where the respective ridge is located, more preferably extend over 75% or more, even more preferably extend over 90% or more, and most preferably extend continuously around the entire circumference.

In this embodiment, the ridges 30 (31 to 33) extend along the tire circumferential direction (that is, to the direction parallel to the tire circumferential direction).

In this embodiment, the ridges 30 (31 to 33) are used to check the remaining tread gauge until the tread rubber 1a reaches the aforementioned wear limit. More specifically, in this embodiment, each of the plurality of ridges 30 (31 to 33) is provided at a relatively outer position in the tire radial direction on the side portion outer surface 21 to check the remaining tread gauge. That is, each of the plurality of ridges 30 (31 to 33) is provided within a tire radial range on the side portion outer surface 21, which is equivalent to the tire radial range where at least the tread portion 1 is present (i.e., the tire radial range between the tire radially outermost position on the outer surface of the tire and the tire radially outermost position on the inner surface of the tire in the tread portion 1). More specifically, in this embodiment, each of the plurality of ridges 30 (31 to 33) is provided at a tire radial position that should indicate the remaining tread gauge (e.g., as illustrated in FIG. 2, 0%, 25%, 50%, etc., respectively, relative to the remaining tread gauge Dn when the tire 10 is new, as described below).

Note, that in FIGS. 1 to 3, only the plurality of ridges 30 provided on the side portion 2 (and thus the side portion outer surface 21) of the tire half on one side in the tire width direction are illustrated, however, the side portion 2 (and thus the side portion outer surface 21) of the tire half on the other side in the tire width direction may or may not have the plurality of ridges 30 as well. However, considering that the tire 10 may be removed from the wheel during use to check the wear condition of the tire 10, or that the tire 10 may be mounted on a vehicle with one side in the tire width direction reversed from the other side (in other words, with the front and back (serial and anti-serial) sides of the tire 10 reversed), it is preferred that the plurality of ridges 30 be provided on the side portion 2 (and thus on the side portion outer surface 21) of the tire half on the other side in the tire width direction as well. In such a case, the plurality of ridges 30 may have a similar configuration (shape, arrangement, etc.) between one side and the other side in the tire width direction, or they may differ from each other.

As described above, according to the present embodiment, the tire 10 is a tire having a smooth pattern, and on the side portion outer surface 21 of the tire 10, a plurality of ridges 30 (31 to 33) protruding from the side portion outer surface 21 and extending in the tire circumferential direction, to check the remaining tread gauge until the tread rubber 1a reaches its wear limit, are provided spaced apart from each other in the tire radial direction. Therefore, according to this embodiment, the plurality of ridges 30 function as a indicator that can check the wear condition, and with this indicator, it can be easily grasped, for example visually, which of the plurality of ridges 30 spaced apart in the tire radial direction the position of the tread surface 11 of the tire 10 in use has reached or exceeded, and in turn, the overview of the remaining tread gauge can be easily confirmed.

In addition, according to this embodiment, because the plurality of ridges 30 to check the remaining tread gauge extends in the tire circumferential direction, when compared to the case where slits for depth gauge insertion are provided at several tread edges on the tire circumference to measure the remaining tread gauge, for example, even if the tread edge is broken or chipped, the remaining tread gauge can be checked by the ridge 30 at other locations on the tire circumference.

From the above, according to the tire of this embodiment, the tire will be a tire having a smooth pattern that allows the remaining tread gauge to be easily grasped.

Also, according to this embodiment, because the plurality of ridges 30 to check the remaining tread gauge protrude from the side portion outer surface 21 and extend in the tire circumferential direction, when compared to the case where grooves extending in the tire circumferential direction are provided on the side portion outer surface to check the remaining tread gauge, for example, there is no risk of cracks at the bottom of the grooves or separation failures between the tread rubber and the belts due to the development of cracks at the bottom of the grooves, and tire durability can be maintained.

In this embodiment, as illustrated in FIG. 2, it is preferred that a numerical value (number) corresponding to the remaining tread gauge is indicated at a position corresponding to each of the plurality of ridges 30 (31 to 34) on the side portion outer surface 21.

More specifically, as illustrated in FIG. 2, the numerical values corresponding to the remaining tread gauge, that is, in the example illustrated in the figure, the numerical values expressed as a percentage of the remaining tread gauge of the tire 10 at the time of attempting to grasp the wear condition of the tire 10 in use with respect to the remaining tread gauge of the tire 10 when it is new ("50" for 50%, "25" for 25%, and "0" for 0% in the illustrated example) are indicated at the positions corresponding to each of the plurality of ridges 30 (31 to 33), that is, in the example illustrated in the figure, at the same tire radial position as the respective tire radial positions of the plurality of ridges 30 (31 to 33) (more specifically, at the tire radial position that overlaps, at least in part, the tire radial region occupied by each of the plurality of ridges 30 (31 to 33)). However, the above-mentioned "numerical values corresponding to the remaining tread gauge" need not be the same as in the example above. For example, as numerical values corresponding to the remaining tread gauge, numerical values that indicate the percentage of tire radial wear with the wear limit as 100% (for example, 100% when the remaining tread gauge is 0% and 75% when the remaining tread gauge is 25%) may be used, which is obtained by subtracting the remaining tread gauge when attempting to grasp the wear condition from the remaining tread gauge when the tire is new. Also, the above-mentioned "a position corresponding to each of the plurality of ridges" need not be as in the example above, and may be, for example, a position in the vicinity in the tire radial direction of each of the plurality of ridges 30 (31 to 33), where the corresponding ridges can be recognized.

The numerical values may be indicated in the same manner as a logo mark, etc. normally displayed on the side portion 2 of the tire 10, for example, by forming it to protrude from the side portion outer surface 21 using a tire manufacturing mold, or by printing it on the side portion outer surface 21.

In addition, the numerical values (numbers) may be indicated colored in a color other than black (e.g., red) to improve visibility.

By having a numerical value corresponding to the remaining tread gauge indicated at a position corresponding to each of the plurality of ridges 30 (31 to 33) on the side portion outer surface 21, the wear condition of the tire 10, and thus the overview of the remaining tread gauge, can be visually checked at a glance, and in turn, the remaining tread gauge can be more easily grasped.

In this embodiment, as illustrated in FIG. 3, it is preferred that the ridge 33 located innermost in the tire radial direction of the plurality of ridges 30 (31 to 33) is provided at a tire radial position corresponding to a wear limit position, which is the wear limit of the tread rubber 1a.

More specifically, in this embodiment, as illustrated in FIG. 3, the wear limit position WL (in FIG. 3, it is indicated as a virtual line extending along the tire width direction), which is the wear limit of the tread rubber 1a, is defined as the tire radial position of the outermost belt layer 6e (more precisely, the outermost part in the tire radial direction of the centerline of the belt layer 6e in its thickness direction) in the tire radial direction of the plurality of belt layers, and the innermost ridge 33 in the tire radial direction of the plurality of ridge 30 (31 to 33) is positioned at the tire radial position corresponding to the wear limit position. In this embodiment, more precisely, the tire radially innermost ridge 33 is arranged so that the tire radially outer end 33eo of the ridge 33 (more precisely, of the top surface 33ts of the ridge 33 (see FIG. 4)) coincides with the wear limit position WL. However, the ridge 33 may be arranged so that any part of the top surface 33ts of the ridge 33, including the tire radial center 33c and the tire radially inner edge 33ei, etc., of the ridge 33 (more precisely, the top surface 33ts of the ridge 33), coincides with the wear limit position WL.

By providing the ridge 33 located innermost in the tire radial direction at the tire radial position corresponding to the wear limit position WL, for example, the remaining tread gauge until the tread rubber reaches its wear limit can be grasped more accurately than if the entire innermost ridge 33 is positioned below or above the wear limit position WL, which is separated from the wear limit position WL.

In this embodiment, as illustrated in FIGS. 1 to 3, it is preferred that the plurality of ridges 30, including the ridge 33 located innermost in the tire radial direction and provided at the tire radial position corresponding to the wear limit position WL of the plurality of ridges 30, consist of three ridges in which tire radial spacing between the ridges adjacent in the tire radial direction is 25% of the remaining tread gauge of the tire when the tire is new. That is, in this embodiment, the plurality of ridges 30 has only three ridges 31, 32, and 33, as illustrated in FIG. 2. In addition, the tire radial spacing D12 between the ridge 31 located outermost in the tire radial direction and the ridge 32 adjacent to the ridge 31 on the inner side in the tire radial direction is the same as the tire radial spacing D23 between the ridge 32 and the ridge 33 adjacent to the ridge 32 on the inner side in the tire radial direction, and both of these are 25% of the remaining tread gauge Dn when the tire 10 is new. Note, that the spacing between each ridge shall be measured with respect to the center 30c (31c to 33c) of each ridge 30 (31 to 33) (more precisely, the top surface of each ridge 31 to 33) in the tire width direction (and thus the center in the tire radial direction).

By having the plurality of ridges 30 consists of three ridges 31 to 33 as described above, for example, a user of the tire 10 can know that the remaining tread gauge has been reduced to 50% of the tire 10 when it is new, if, during use of the tire 10, the tire radial position of the tread surface 11 at least on the side portion outer surface 21 of the tire 10 reaches the outermost ridge 31 in the tire radial direction, and that the remaining tread gauge has been reduced to 25% of the tire 10 when it is new, if, during use of the tire 10, the tire radial position of the tread surface 11 at least on the side portion outer surface 21 of the tire 10 reaches the ridge 32 adjacent to the ridge 31 on the inner side in the tire radial direction, etc. That is, the plurality of ridges 30 consists of three ridges 31 to 33 as described above, which allows the remaining tread gauge to be more accurately grasped step by step until the wear limit is reached, which in turn the ridges 30 can be effectively used, for example, to manage the wear condition of the tire 10.

In addition, as mentioned above with reference to FIG. 2, in this embodiment, at the position corresponding to each of the plurality of ridges 31 to 33, a numerical value (number) of "50" indicating 50%, "25" indicating 25%, and "0" indicating 0%, which is the percentage of the remaining tread gauge to the remaining tread gauge Dn when the tire 10 is new, is respectively indicated in order. Thus, according to this embodiment, the remaining tread gauge can be more accurately grasped step by step and more easily at a glance.

In this embodiment, as illustrated in FIG. 1 to 3, the tire 10 may be further provided with a slit 40 extending from the tread surface 11 to the side portion outer surface 21 (i.e., including the tread edge TE, and opening in the tread surface 11 and the side portion outer surface 21) to be used to check the remaining tread gauge by inserting a depth gauge through the tread surface 11 and measuring the depth. In this case, since it is possible to measure the specific remaining depth of the slit 40, and thus the specific remaining tread gauge, in the middle of the wear of the tire 10, in combination with the plurality of ridges 30 that allow a more schematic view of the remaining tread gauge, the remaining tread gauge can be more accurately grasped.

The tire radial position of the bottom of the slit (i.e., the inner end in the tire radial direction) 40ei on the side portion outer surface 21 is not particularly limited, but from the perspective of making it easier to grasp the remaining tread gauge, it is preferred to set the position to the tire radial position corresponding to the wear limit position WL.

Although FIGS. 1 to 3 illustrate only the slit 40 at one location on the circumference of the tire 10, the slit 40 may be provided at multiple locations (e.g., two locations) on the tire circumference. For example, if the slits 40 are provided at two locations on the tire circumference (i.e., two slits 40 on the tire circumference), they may be provided at opposite locations on the circumference (i.e., separated by 180° from each other at a center angle) for ease of grasping the remaining tread gauge.

Furthermore, although FIGS. 1 to 3 illustrate only the slit 40 provided in the tire half on one side in the tire width direction, the tire half on the other side in the tire width direction may or may not have the slit 40 as well. However, considering that the tire 10 may be removed from the wheel during use to check the wear condition of the tire 10, or that the tire 10 may be mounted on a vehicle with one side in the tire width direction reversed from the other side (in other words, with the front and back (serial and anti-serial) sides of the tire 10 reversed), it is preferred that the slit 40 be provided on the tire half on the other side in the tire width direction as well. In such a case, the slit 40 may have a similar configuration (shape, arrangement, etc.) between one side and the other side in the tire width direction, or they may differ from each other. In addition, for example, when the slits 40 are provided at two locations on the circumference of tire half on one side and the tire half on other side in the tire width direction (i.e., two slits in each of the tire half), from the viewpoint of ease of grasping the remaining tread gauge and the rigidity balance near the tread edge on both sides, these slits 40 may be phase-shifted so that, for example, in each half, the two slits 40 are arranged 180° apart from each other at a center angle, and between each half, the slits 40 are arranged 900 apart from each other at a center angle.

Next, with reference to FIG. 4, the preferred configuration, etc., of the ridges 30 will be explained.

Figure 4:
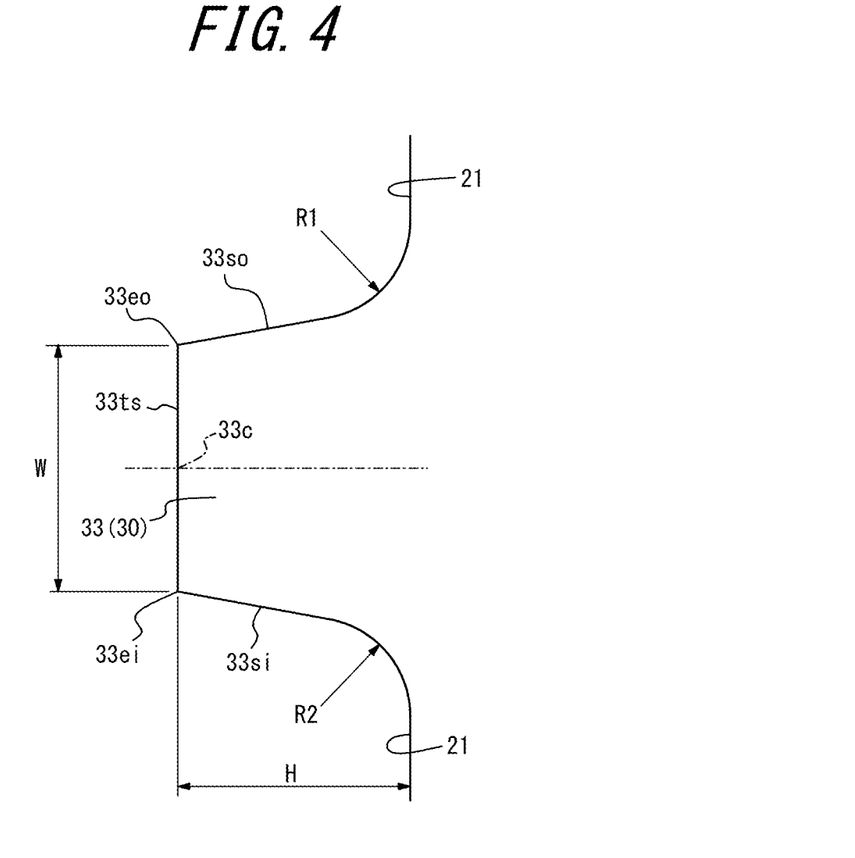
FIG. 4 is a cross-sectional view of a ridge in FIG. 2, taken along the line Y-Y in FIG. 2.

FIG. 4 is a cross-sectional view of the ridge in FIG. 2, illustrated by a section along the line Y-Y in FIG. 2. FIG. 4 illustrates the cross-sectional shape of the innermost ridge 33 in the tire radial direction as a typical example of the plurality of ridges 31 to 33. Although the cross-sectional shape, etc. of the ridge 33 will be described below, the cross-sectional shapes, etc. of other ridges 31 and 32 are also the same as described below. The cross-sectional shape of the ridges 31 and 32 may be the same or different from that of the ridge 33. In this embodiment, the cross-sectional shapes of the plurality of ridges 31 to 33 are the same as each other.

The height H of the ridge 33 from the side portion outer surface 21 is not particularly limited, but is preferably 0.8 to 1.2 mm from the viewpoint of visibility of the ridge (i.e., ease of visually confirming the presence and location of ridges, etc.) and suppression of rubber volume increase.

In addition, the width W of the top surface 33ts of the ridge 33 is also not particularly limited, but from the viewpoint of visibility of the ridge and functionality of the ridge as an indicator, 2 to 6 mm is preferred, and 3 to 5 mm is more preferred.

Furthermore, in the example of FIG. 4, the connecting part between the tire radially outer side surface 33so of the ridge 33 and the side portion outer surface 21 and the connecting part between the tire radially inner side surface 33si in the tire radial direction of the ridge 33 and the side portion outer surface 21 are formed in arc shapes with radius of curvature R1 and radius of curvature R2, respectively. This prevents stress concentration at the base of the ridge, which in turn prevents the ridge from breaking or chipping. The radius of curvatures R1 and R2 are preferably larger than 0.3 mm, respectively, from the viewpoint of effectively suppressing ridge breaking and chipping.

In addition, in the example in FIG. 4, the tire radially outer edge 33eo and the tire radially inner edge 33ei of the top surface 33ts of the ridge 33 are angularly formed in a cross-section, thereby making both ends clearly visible and enhancing the visibility of the ridge and its function as an indicator.

However, both ends may be formed rounded.

In the example in FIG. 4, as illustrated in FIG. 4, the internal angle of the ridge 33 between the top surface 33ts and the tire radially outer side surface 33so at the tire radially outer edge 33eo of the top surface 33ts of the ridge 33; and the internal angle of the ridge 33 between the top surface 33ts and the tire radially inner side surface 33si at the tire radially inner edge 33ei of the top surface 33ts of the ridge 33, in cross-section, are both larger than 90°, thereby suppressing the ridge from breaking or chipping. However, both angles may be formed at 900 or less.

The ridges 30 (31 to 33) can be formed to protrude from the side portion outer surface 21 using, for example, a tire manufacturing mold, similar to a logo mark, etc. normally displayed on the side portion 2 of the tire 10.

In addition, the ridges 30 (31 to 33) may be colored at least on their top surface or entire outer surface in a color other than black (e.g., red) to improve visibility.

The above describes an exemplary embodiment of this disclosure, and various changes can be made without departing from the scope of the claims.

INDUSTRIAL APPLICABILITY

The tire according to the present disclosure can be suitably used for any type of tire with a smooth pattern, for example: tires for construction and mining vehicles with a smooth pattern, such as road hall dump truck tires and wheel loader tires; tires for industrial vehicles with a smooth pattern, such as reach stacker and container handler tires; and tires for track vehicles with a smooth pattern, etc.

REFERENCE SIGNS LIST

1 Tread portion
1a Tread rubber
2 Side portion
5 Carcass
6 Belt
6a-6e Belt layer
10 Tire
11 Tread surface
21 Side portion outer surface
30, 31-33 Ridges
30c, 31c-33c Center of top surface of ridge
33ei Tire radially inner edge of top surface of ridge
33eo Tire radially outer edge of top surface of ridge
33si Tire radially inner side surface of ridge
33so Tire radially outer side surface of ridge
33ts Top surface of ridge
40 Slit
40ei Inner end of slit in the tire radial direction
CD Tire circumferential direction
D12, D23 Tire radial spacing
Dn Remaining tread gauge when tire is new
H Height of ridge
R1, R2 Radius of curvature
RD Tire radial direction
TE Tread edge
W Width of top surface of ridge
WD Tire width direction
WL Wear limit position

The invention claimed is:

1. A tire having a smooth pattern with substantially no grooves on a tread surface of a tread portion including tread rubber, wherein
   on a side portion outer surface of the tire, a plurality of ridges protruding from the side portion outer surface and extending in the tire circumferential direction, for checking a remaining tread gauge until the tread rubber reaches its wear limit, are provided spaced apart from each other in the tire radial direction,
   the tire is further provided with a slit extending from the tread surface to the side portion outer surface to be used to check the remaining tread gauge by inserting a depth gauge from the tread surface and measuring the depth,
   walls defining the slit are substantially free of protrusions and recesses,
   a numerical value corresponding to the remaining tread gauge is indicated at a position corresponding to each of the plurality of ridges on the side portion outer surface, and
   in a tire circumferential direction, the numerical value is positioned between the corresponding ridge and the slit.

2. The tire according to claim 1, wherein the ridge located innermost in the tire radial direction of the plurality of ridges is provided at a tire radial position corresponding to a wear limit position, which is the wear limit of the tread rubber.

3. The tire according to claim 2, wherein the plurality of ridges consists of three ridges in which tire radial spacing between the ridges adjacent in the tire radial direction is 25% of the remaining tread gauge of the tire when the tire is new.

4. The tire according to claim 1, wherein, in a cross-section of the ridge, a connecting part between a tire radially outer side surface of one of the plurality of ridges and the side portion outer surface, and a connecting part between a tire radially inner side surface of said one of the plurality of ridges and the side portion outer surface, are formed in arc shapes with a first radius of curvature and a second radius of curvature, respectively, and the first radius of curvature and the second radius of curvature are each larger than 0.3 mm.

5. The tire according to claim 1, wherein the slit comprises a first set of two slits provided on the circumference of a tire half on one side in the tire width direction and a second set of two slits provided on the circumference of a tire half on the other side in the tire width direction.

\* \* \* \* \*